(12) United States Patent
Fujiki (10) Patent No.: US 8,780,954 B2
(45) Date of Patent: Jul. 15, 2014

(54) WIRELESS COMMUNICATION APPARATUS AND WIRELESS COMMUNICATION METHOD

(75) Inventor: Hiroyuki Fujiki, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 290 days.

(21) Appl. No.: 13/237,044

(22) Filed: Sep. 20, 2011

(65) Prior Publication Data

US 2012/0243575 A1    Sep. 27, 2012

(30) Foreign Application Priority Data

Mar. 25, 2011  (JP) .................................. 2011-068390

(51) Int. Cl.
*H04B 1/69* (2011.01)
*H04B 1/707* (2011.01)
*H04B 1/713* (2011.01)

(52) U.S. Cl.
USPC ........... 375/133; 375/135; 375/136; 375/132; 375/260; 375/346; 370/437; 455/226.2; 455/226.3; 455/227; 455/296

(58) Field of Classification Search
USPC ......... 375/260, 346, 349, 285, 284, 132, 133, 375/136, 135; 370/437; 455/226.2, 226.3, 455/227, 296
See application file for complete search history.

(56) References Cited

U.S. PATENT DOCUMENTS

| | | | |
|---|---|---|---|
| 7,324,791 B2 | 1/2008 | Nakatani et al. | |
| 2002/0039888 A1 | 4/2002 | Hama | |
| 2005/0164649 A1 | 7/2005 | Nakatani et al. | |
| 2005/0220135 A1* | 10/2005 | Honda et al. | 370/437 |
| 2008/0291983 A1* | 11/2008 | Myers | 375/219 |

FOREIGN PATENT DOCUMENTS

| | | |
|---|---|---|
| CN | 1645741 A | 7/2005 |
| JP | 4-347932 A | 12/1992 |
| JP | 2001-156657 A | 6/2001 |
| JP | 2002-111603 A | 4/2002 |
| JP | 2002-1116030 A | 4/2002 |
| JP | 2002-164804 A | 6/2002 |

(Continued)

OTHER PUBLICATIONS

Japanese Office Action corresponding to Japanese Application No. 2011-068390, issued Jun. 14, 2013 with an English translation.

(Continued)

*Primary Examiner* — Phuong Phu
(74) *Attorney, Agent, or Firm* — White & Case LLP (57) ABSTRACT

According to an embodiment, a wireless communication apparatus includes a communication control unit, a transmitting unit and a receiving unit. The communication control unit selects one frequency channel from a plurality of frequency channels and switches the frequency channel to be selected. The receiving unit is configured to receive a reception signal of the selected frequency channel from another wireless communication apparatus. The receiving unit includes an interference wave detection circuit configured to detect an interference wave signal of a detection frequency. The interference wave signal is included in an input signal received during an interference wave detection period. In the interference wave detection period, the reception signal is not received. The communication control unit masks a frequency channel related to the detection frequency among the plurality of frequency channels to create a frequency channel map. The communication control unit does not select the masked frequency channel.

14 Claims, 7 Drawing Sheets

(56) References Cited

FOREIGN PATENT DOCUMENTS

| | | |
|---|---|---|
| JP | 2005-130122 | 5/2005 |
| JP | 2006-67462 A | 3/2006 |
| JP | 2006-345274 A | 12/2006 |
| JP | 2007-243765 | 9/2007 |
| JP | 2008-205867 A | 9/2008 |
| JP | 2010-278764 | 12/2010 |

OTHER PUBLICATIONS

Chinese Office Action issued in corresponding Chinese Application No. 201110277883.7 issued Dec. 30, 2013, and an English translation thereof.

Japanese Office Action issued on Mar. 14, 2014 in corresponding Japanese Application No. 2011-068390, along with English translation.

* cited by examiner

WIRELESS COMMUNICATION APPARATUS AND WIRELESS COMMUNICATION METHOD

CROSS REFERENCE TO RELATED APPLICATION

This application is based upon and claims the benefit of priority from the prior Japanese Patent Application No. 2011-068390 filed on Mar. 25, 2011 in Japan, the entire contents of which are incorporated herein by reference.

FIELD

Embodiments described herein relate generally to a wireless communication apparatus and a wireless communication method.

BACKGROUND

As a wireless communication apparatus that uses a frequency hopping method, for example, a wireless communication apparatus compatible with Bluetooth (registered trademark) is known. The wireless communication apparatus selects one frequency channel from a plurality of frequency channels specified in a frequency band of 2.4 GHz band and switches frequency channel to be selected as time passes. The wireless communication apparatus performs wireless communication with another wireless communication apparatus by using the selected frequency channel.

The above frequency band is also used by, for example, a wireless LAN. Therefore, when the frequency channel used for communication by the above wireless communication apparatus overlaps with the frequency channel used for communication by the wireless LAN, received data may be error in each communication. Thus, the wireless communication apparatus detects the frequency channel used by the wireless LAN during a reception operation and selects a frequency channel so as to avoid the detected frequency channel.

However, there is a case in which communication quality of desired wave of the wireless communication apparatus is degraded due to an interference signal which is a strong signal present outside of the 2.4 GHz band described above.

DETAILED DESCRIPTION

According to an embodiment, a wireless communication apparatus is configured to perform time-division wireless communication with another wireless communication apparatus using a frequency hopping method. The wireless communication apparatus includes a communication control unit, a transmitting unit and a receiving unit. The communication control unit is configured to select one frequency channel from a plurality of frequency channels and configured to switch the frequency channel to be selected as time passes. The transmitting unit is configured to transmit a transmission signal of the selected frequency channel to the other wireless communication apparatus. The receiving unit is configured to receive a reception signal of the selected frequency channel from the other wireless communication apparatus. The receiving unit includes an interference wave detection circuit configured to detect an interference wave signal of a detection frequency. The interference wave signal is included in an input signal received during an interference wave detection period. In the interference wave detection period, the reception signal is not received. The communication control unit is configured to mask a frequency channel related to the detection frequency among the plurality of frequency channels to create a frequency channel map. The interference wave signal is detected at the detection frequency by the interference wave detection circuit. The communication control unit does not select the masked frequency channel.

Hereinafter, embodiments of the present invention will be described with reference to the drawings. These embodiments do not limit the present invention.

(First Embodiment)

One of the features of a first embodiment is that, if an interference wave signal is detected in an interference wave detection period before starting wireless communication, a frequency hopping is performed so as not to select a frequency channel in which the wireless communication is disturbed by the interference wave signal.

Figure 1:
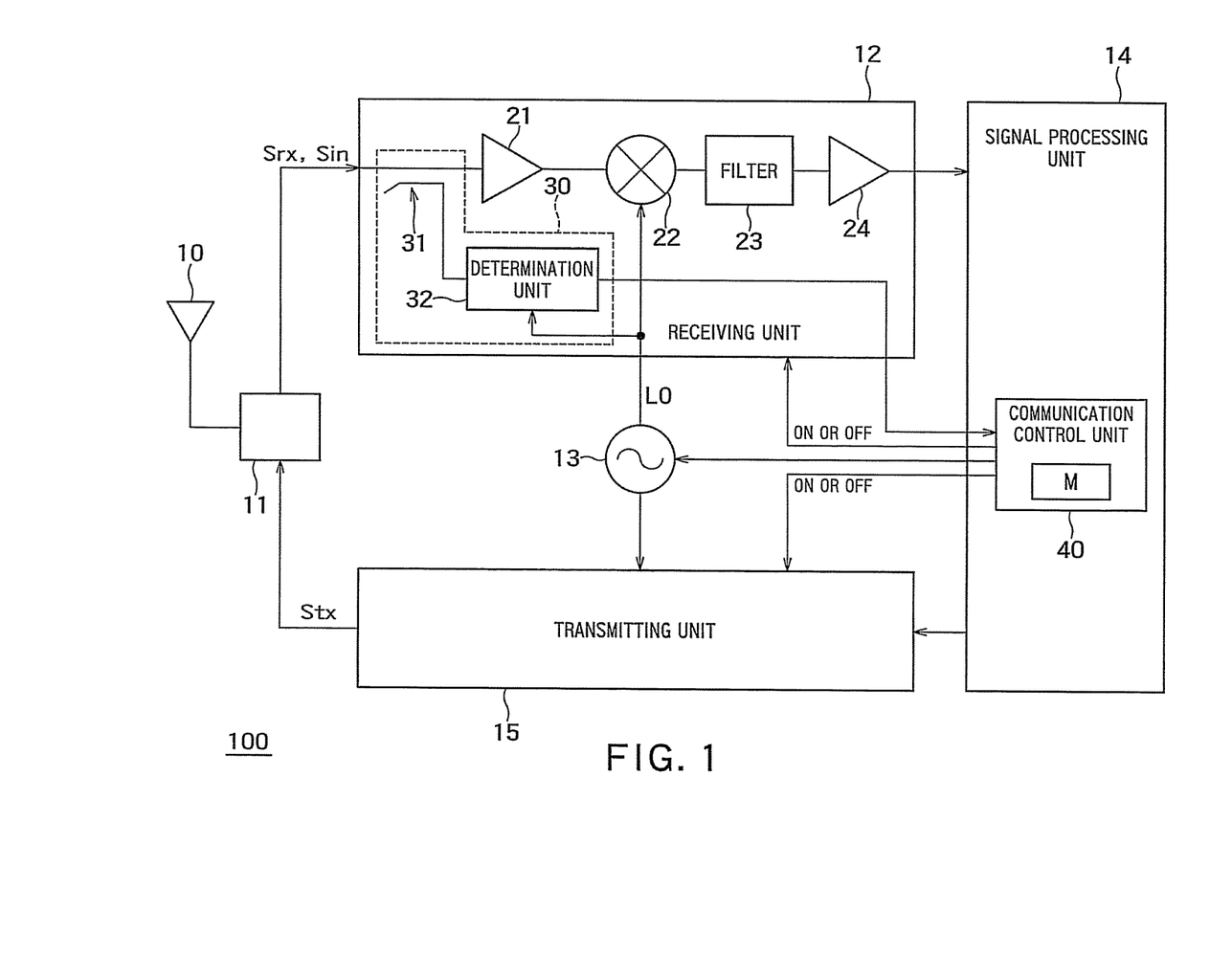
FIG. 1 is a block diagram showing a schematic configuration of a wireless communication apparatus according to a first embodiment of the present invention.

FIG. 1 is a block diagram showing a schematic configuration of a wireless communication apparatus according to the first embodiment of the present invention. As shown in FIG. 1, a wireless communication apparatus 100 includes an antenna 10, a switching unit 11, a receiving unit 12, an oscillator 13, a signal processing unit 14, and a transmitting unit 15. The receiving unit 12 has a first amplifier 21, a mixer 22, a filter 23, a second amplifier 24, and an interference wave detection circuit 30. The signal processing unit 14 has a communication control unit 40.

The wireless communication apparatus 100 performs time-division wireless communication with another wireless communication apparatus (not shown in the drawings) by a frequency hopping method. For example, the wireless communication apparatus 100 is assumed to be compatible with Bluetooth.

The antenna 10 transmits a transmission signal Stx and receives a reception signal Srx. The switching unit 11 provides the reception signal Srx received by the antenna 10 to the receiving unit 12. The switching unit 11 provides the transmission signal Stx outputted from the transmitting unit 15 to the antenna 10.

The communication control unit 40 controls wireless communication. The communication control unit 40 selects one frequency channel from a plurality of predetermined frequency channels and switches frequency channel to be selected as time passes. Thereby, the frequency hopping is performed. The communication control unit 40 controls the receiving unit 12 and the transmitting unit 15 to be on or off at a predetermined timing.

The oscillator 13 is controlled by the communication control unit 40 to provide a local signal LO having a predetermined frequency to the receiving unit 12 and the transmitting unit 15. When transmission or reception is performed, the frequency of the local signal LO is determined according to the selected frequency channel.

The receiving unit 12 receives the reception signal Srx of the selected frequency channel from another wireless communication apparatus via the antenna 10 and the switching unit 11. Specifically, the first amplifier 21 amplifies the received reception signal Srx. The mixer 22 converts the frequency of an output signal of the first amplifier 21 by the local signal LO and outputs the signal as a low frequency signal. The filter 23 band-limits the low frequency signal. The filter 23 is a band-pass filter (BPF) or a low-pass filter (LPF). The second amplifier 24 amplifies the low frequency signal that has been band-limited by the filter 23 and outputs the amplified signal as a reception baseband signal or a reception intermediate frequency signal.

The interference wave detection circuit 30 in the receiving unit 12 detects an interference wave signal of a detection frequency included in an input signal Sin received via the antenna 10 and the switching unit 11 during an interference wave detection period in which no reception signal Srx is received from another wireless communication apparatus. The detection frequency is determined by the local signal LO. Here, the interference wave detection period means a period of time before starting wireless communication with another wireless communication apparatus.

The signal processing unit 14 processes the reception baseband signal or the reception intermediate frequency signal from the receiving unit 12 to obtain reception data, as well as generates a transmission baseband signal or a transmission intermediate frequency signal on the basis of transmission data.

The transmitting unit 15 assigns the transmission baseband signal or the transmission intermediate frequency signal received from the signal processing unit 14 to the transmission signal Stx of the selected frequency channel by using the local signal LO. Subsequently, the transmitting unit 15 transmits the transmission signal Stx to another wireless communication apparatus via the switching unit 11 and the antenna 10.

Further, the communication control unit 40 masks a frequency channel related to the detection frequency, where the interference wave detection circuit 30 detects an interference wave signal, among a plurality of frequency channels, and creates a frequency channel map M. For example, the frequency channel map M is stored in the communication control unit 40. The detection frequencies and the frequency channels are associated with each other in advance. When performing wireless communication, the communication control unit 40 performs frequency hopping so as not to select the masked frequency channel by referring to the frequency channel map M. The communication control unit 40 notifies another wireless communication apparatus of the created frequency channel map M.

The interference wave detection circuit 30 has a coupler 31 and a determination unit 32. The coupler 31 detects the input signal Sin received by the receiving unit 12. The determination unit 32 determines that an interference wave signal is detected if a signal level at the detection frequency of a detection input signal detected by the coupler 31 is greater than or equal to a reference value. The detection frequency is controlled according to the frequency of the local signal LO.

The coupler 31 can be formed by, for example, a capacitor, a transformer, or the like.

Figure 2:
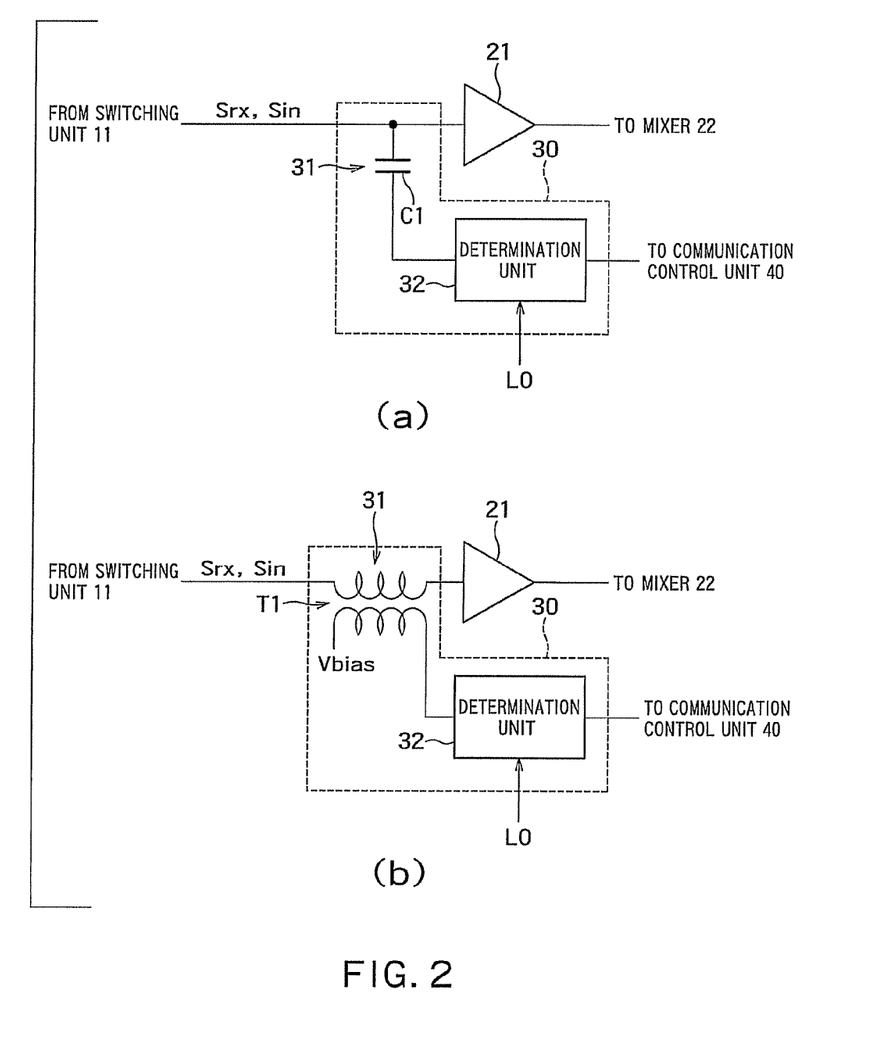
FIG. 2 is an example of a circuit diagram of the interference wave detection circuit according to the first embodiment of the present invention.

FIG. 2(a) is a circuit diagram of the interference wave detection circuit 30 using a capacitor C1 as the coupler 31. One terminal of the capacitor C1 is connected to the input of the first amplifier 21 and the other terminal is connected to the determination unit 32.

FIG. 2(b) is a circuit diagram of the interference wave detection circuit 30 using a transformer T1 as the coupler 31. The reception signal Srx and the input signal Sin are provided to one terminal of the primary side of the transformer T1 by the switching unit 11. The other terminal of the primary side of the transformer T1 is connected to the input of the first amplifier 21. A bias voltage Vbias is supplied to one terminal of the secondary side of the transformer T1. The other terminal of the secondary side of the transformer T1 is connected to the determination unit 32.

Figure 3:
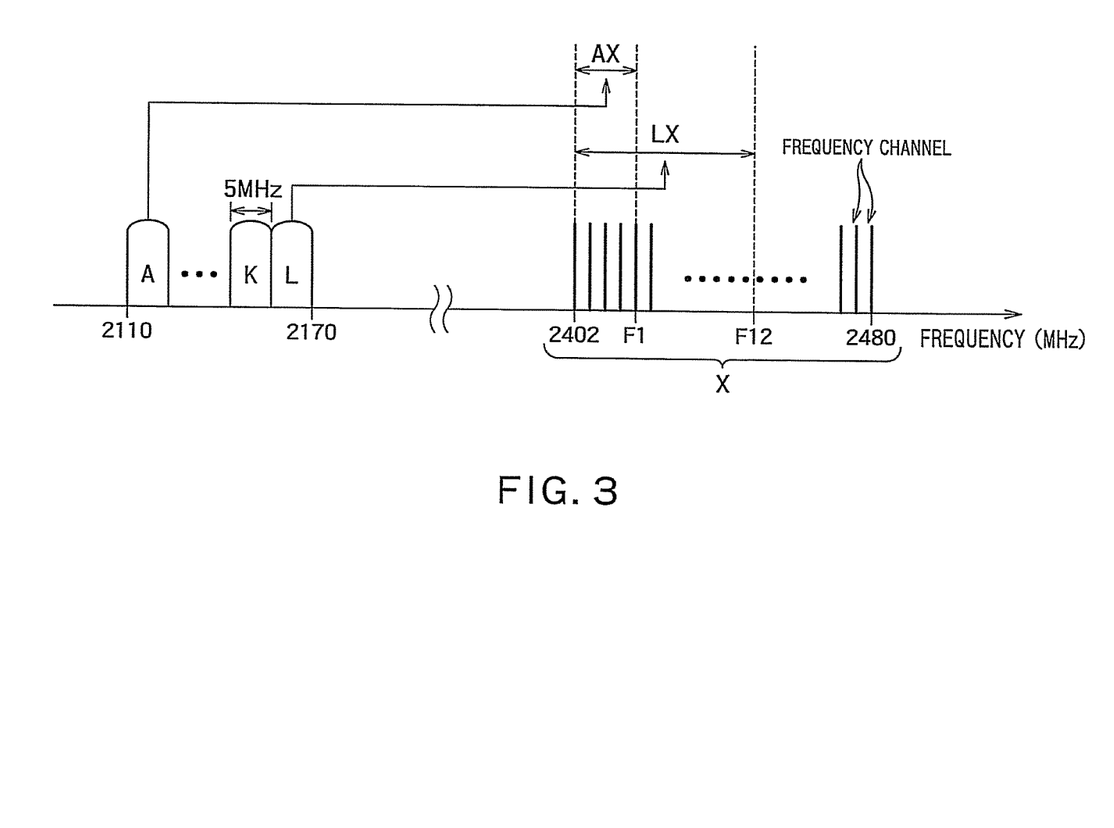
FIG. 3 is a diagram showing about frequencies of the wireless communication apparatus according to the first embodiment of the present invention.

Next, an example of a relationship between the frequency channel and the frequency of the interference wave signal. FIG. 3 is a diagram showing about frequencies of the wireless communication apparatus 100 according to the first embodiment of the present invention. As shown in FIG. 3, a plurality of frequency channels used by the wireless communication apparatus 100 are set within a frequency range X between 2402 MHz and 2480 MHz. Each frequency channel has a bandwidth of 1 MHz.

Frequency channels A to L used by another wireless communication system are set within a frequency range between 2110 MHz and 2170 MHz. Each of the frequency channels A to L has a bandwidth of about 4 MHz. Here, the other wireless communication system is assumed to be a W-CDMA system.

A strong signal (interference wave signal) in the frequency channel A of the other wireless communication system disturbs wireless communication of the wireless communication apparatus 100 in frequency channels of a frequency range AX between 2402 MHz and F1 MHz. That is to say, when the interference wave signal is present, an error occurs in reception data obtained from the reception signal Srx in the frequency channels of the frequency range AX. In this case, if a frequency channel outside of the frequency range AX is used, the reception data is not affected by the interference wave signal.

Similarly, strong signals in the frequency channels B to K of the other wireless communication system respectively disturb wireless communication of the wireless communication apparatus 100 in frequency channels of corresponding frequency range (not shown in the drawings).

A strong signal in the frequency channel L of the other wireless communication system disturbs wireless communication of the wireless communication apparatus 100 in frequency channels of a frequency range LX between 2402 MHz and F12 MHz. In this case, if a frequency channel outside of the frequency range LX is used, the reception data is not affected by the interference wave signal. It is assumed that the frequency F1< ... <F12.

In this way, when a frequency channel, which is certain frequencies away from the frequency channel of the interference wave signal, is used, the wireless communication of the wireless communication apparatus 100 is not disturbed by the interference wave signal.

Although the description above uses an example in which the frequency of the interference wave signal is lower than the frequency range X, the same description applies to the cases where the frequency of the interference wave signal is higher than the frequency range X.

Next, an operation of the wireless communication apparatus 100 (creation of the frequency channel map M) will be described with reference to a flowchart in FIG. 4.

Figure 4:
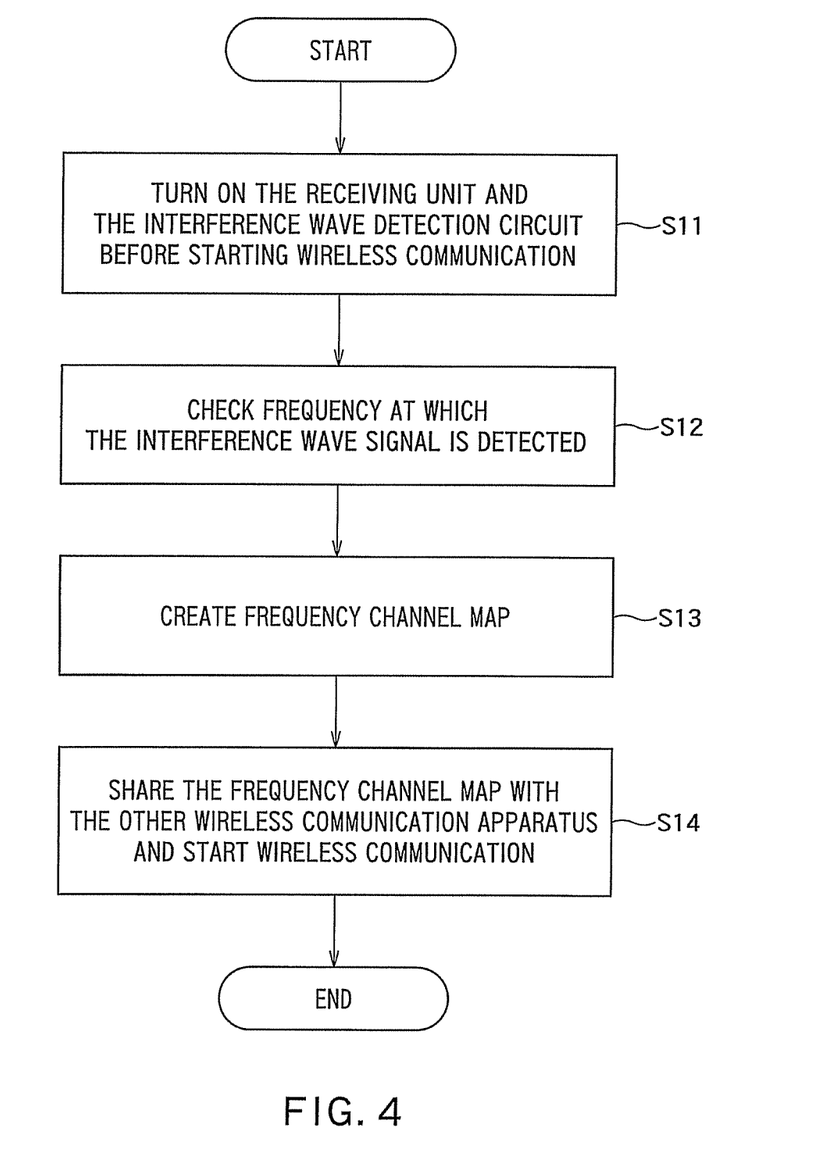
FIG. 4 is a flowchart showing the operation of the wireless communication apparatus according to the first embodiment of the present invention.

FIG. 4 is a flowchart showing the operation of the wireless communication apparatus 100 according to the first embodiment of the present invention. As shown in FIG. 4, first, the communication control unit 40 turns on the receiving unit 12 and the interference wave detection circuit 30 before starting wireless communication (step S11). Thereby, the interference wave detection period starts.

Next, the communication control unit 40 checks the frequency at which the interference wave signal is detected (step S12). Specifically, the interference wave detection circuit 30 detects an interference wave signal of the detection frequency included in the received input signal Sin. Thereby, the communication control unit 40 identifies the detection frequency at which the interference wave detection circuit 30 detects the interference wave signal.

In this step, the communication control unit 40 controls the oscillator 13 so that the frequency of the local signal LO changes sequentially. The interference wave detection circuit 30 sequentially changes the detection frequency according to the frequency of the local signal LO. Thereby, the communication control unit 40 can identify one or more detection frequencies on the basis of the frequency of the local signal LO at the time when the interference wave detection circuit 30 detects an interference wave signal.

Next, the communication control unit 40 creates the frequency channel map M (step S13). Specifically, the communication control unit 40 masks frequency channels related to the detection frequencies, where the interference wave detection circuit 30 detects an interference wave signal, among a plurality of frequency channels, and creates the frequency channel map M. For example, in FIG. 3, it is assumed that an interference wave signal in the frequency channel A (detection frequency is between 2110 and 2115 MHz) of the other wireless communication system and an interference wave signal in the frequency channel L (detection frequency is between 2165 and 2170 MHz) of the other wireless communication system are detected. In this case, the communication control signal 40 masks the frequency channels of the frequency range AX related to the frequency channel A and the frequency channels of the frequency range LX related to the frequency channel L. In other words, the communication control unit 40 masks frequency channels within a predetermined frequency range around the detection frequency.

When the frequency channel map M is created, the interference wave detection period ends.

Next, the wireless communication apparatus 100 shares the frequency channel map M with the other wireless communication apparatus and starts wireless communication (step S14).

Specifically, the communication control unit 40 notifies the other wireless communication apparatus of the created frequency channel map M via the signal processing unit 14 and the transmitting unit 15. After starting the wireless communication, the communication control unit 40 refers to the frequency channel map M and selects a frequency channel so as not to select a masked frequency channel.

By making such an operation, the wireless communication apparatus 100 can perform wireless communication with the other wireless communication apparatus while performing frequency hopping using a frequency channel that is not affected by the interference wave signal.

In addition to the operation described above, when there is an unnecessary radio wave (for example, radio wave of wireless LAN or the like) in the frequency range X, the wireless communication apparatus 100 performs frequency hopping so as to avoid a frequency channel in which the unnecessary radio wave is present.

As described above, according to the present embodiment, an interference wave signal of the detection frequency, which is included in the input signal Sin received during the interference wave detection period before starting wireless communication, is detected. Thereafter, among a plurality of frequency channels, frequency channels related to the detection frequency at which an interference wave signal is detected are masked, and the frequency channel map M is created so as not to select the masked frequency channels. Thereby, it is possible to perform wireless communication while performing frequency hopping using frequency channels other than the frequency channels that are disturbed by the interference wave signal. As a result, no error occurs in the reception data and high quality wireless communication can be performed even in an environment in which there is an interference wave signal from another wireless communication system.

Further, since a high frequency filter for removing interference wave signals is not necessary, it is possible to suppress an increase in cost, area, and power consumption.

(Second Embodiment)

A second embodiment is different from the first embodiment in that the interference wave detection period is set in a period between transmission and reception while wireless communication with the other wireless communication apparatus is performed.

In other words, in the wireless communication apparatus according to the present embodiment, the function of the communication control unit 40 is different from that of the first embodiment. The other constituent elements are the same as those of the first embodiment shown in FIG. 1. Accordingly, the same constituent elements are given the same reference numerals and the description thereof will not be repeated.

Figure 5:
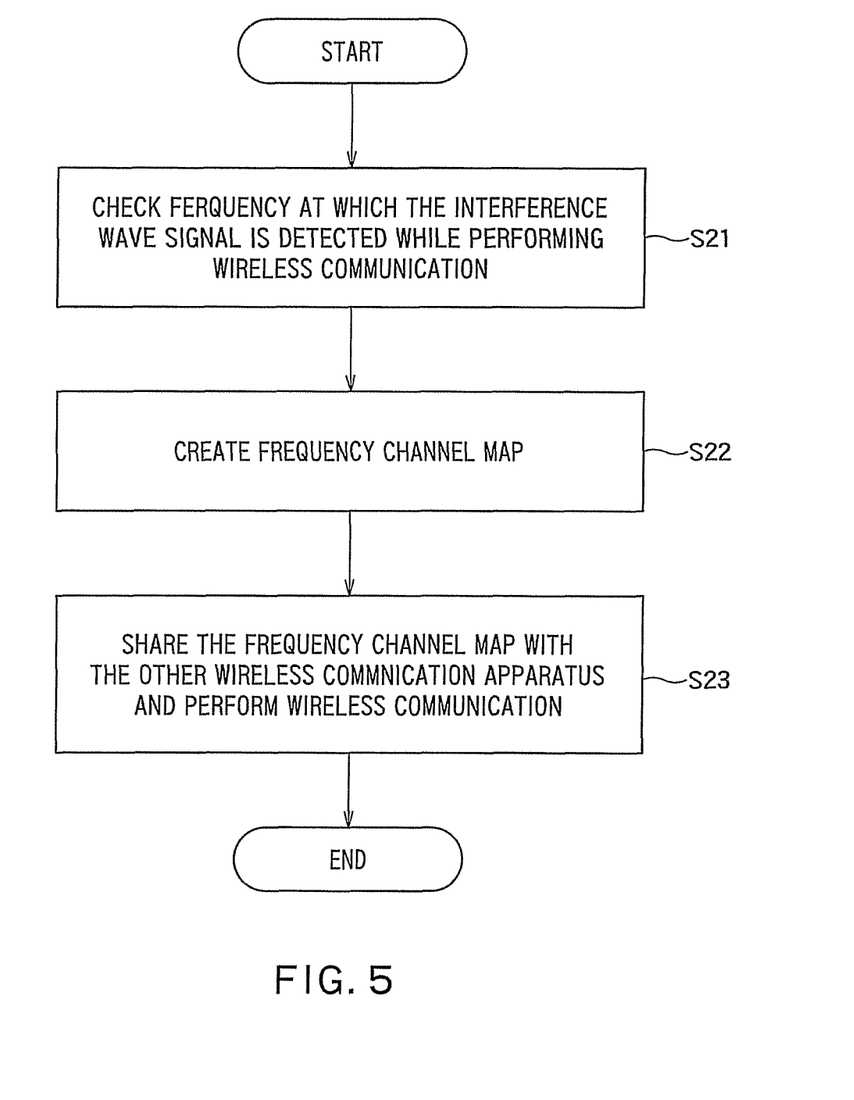
FIG. 5 is a flowchart showing an operation of the wireless communication apparatus according to a second embodiment of the present invention.

FIG. 5 is a flowchart showing an operation (creation of frequency channel map) of the wireless communication apparatus according to the second embodiment of the present invention. First, the communication control unit 40 checks the frequency at which the interference wave signal is detected in the same manner as in the first embodiment during a period (interference wave detection period) between transmission and reception while wireless communication with the other wireless communication apparatus is performed (step S21).

Next, in the same manner as in the first embodiment, the communication control unit 40 creates the frequency channel map M (step S22).

Next, in the same manner as in the first embodiment, the communication control unit 40 shares the frequency channel map M with the other wireless communication apparatus and performs communication (step S23).

In the wireless communication in step S23 and the wireless communication thereafter, the communication control unit 40 refers to the frequency channel map M and selects a frequency channel so as not to select a masked frequency channel.

By making such an operation, the wireless communication apparatus can perform wireless communication while performing frequency hopping using a frequency channel that is not affected by the interference wave signal.

The frequency channel map may be updated by performing a series of processes from step S21 to step S23 described above every certain period of time.

The frequency channel map may be updated in each period between transmission and reception by performing a series of processes described above. In this case, the number of masked channels is limited so that at least two frequency channels are not masked. Thereby, even when all maskable frequency channels are masked, the frequency hopping can be performed.

According to the present embodiment, the interference wave signal is detected while wireless communication is being performed and the frequency channels are masked based on the detection result, so that it is possible to perform wireless communication using more appropriate frequency channel even when the frequency and the strength of the interference wave signal vary over time.

(Third Embodiment)

Figure 6:
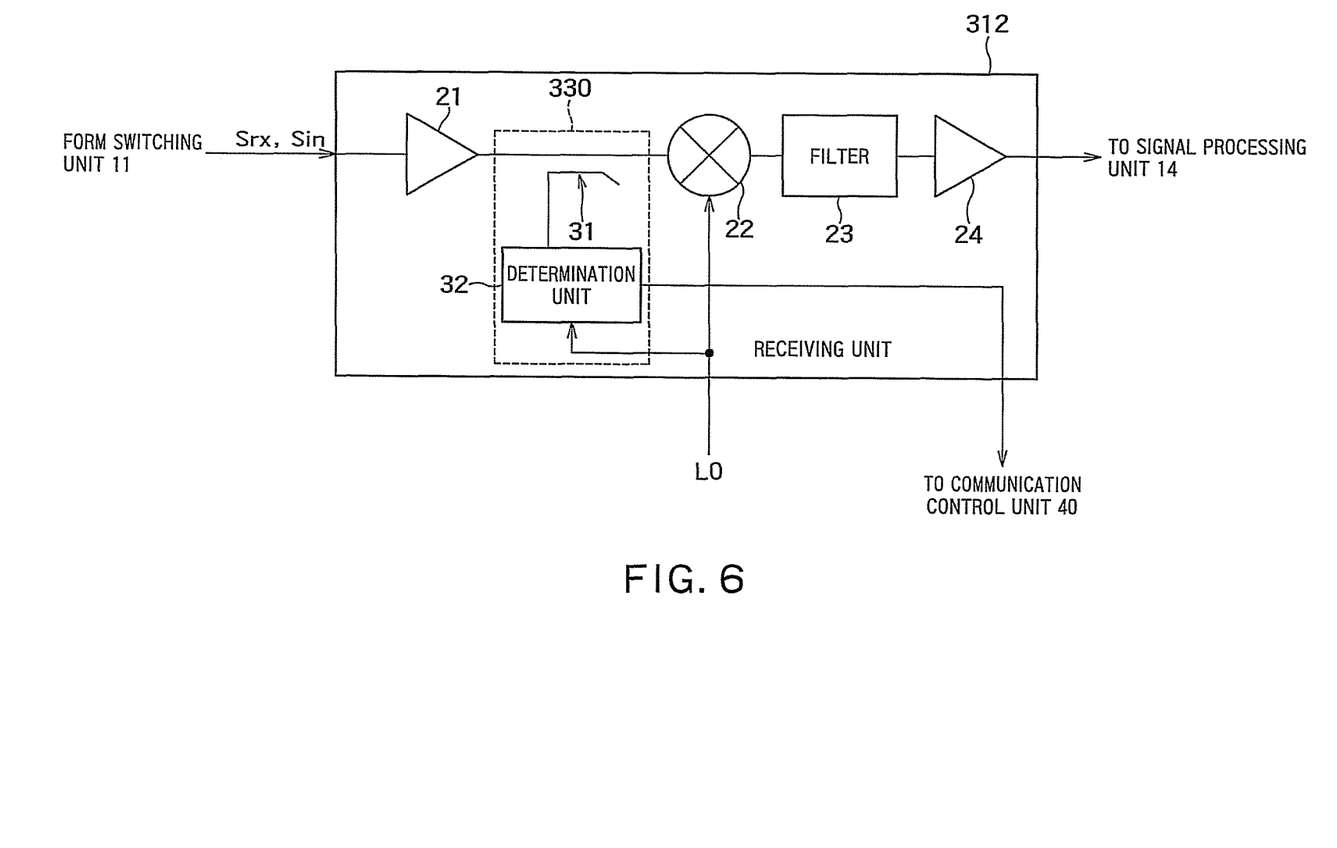
FIG. 6 is a block diagram showing a schematic configuration of a receiving unit of a wireless communication apparatus according to a third embodiment of the present invention.

As shown in FIG. 6, a wireless communication apparatus according to a third embodiment is different from that of the first embodiment in that a coupler 31 of an interference wave detection circuit 330 is connected to the output of the first amplifier 21 in a receiving unit 312. The other constituent elements are the same as those of the first embodiment shown in FIG. 1. Accordingly, the same constituent elements are given the same reference numerals and the description thereof will not be repeated. Also by this configuration, the interference wave detection circuit 330 can detect an interference wave signal of the detection frequency included in the input signal Sin received during the interference wave detection period, in which no reception signal Srx is received, by another wireless communication apparatus.

The timing to detect the interference wave signal is the same as that in the first or the second embodiment. In other words, the wireless communication apparatus according to the present embodiment operates as shown in the flowchart of FIG. 4 or FIG. 5.

According to the present embodiment, since no coupler is connected to the input of the first amplifier 21 of the receiving unit 312, the loss of the reception signal Srx is smaller than that of the first embodiment. Thereby, noise figure (NF) of the receiving unit 312 is improved compared with that of the first embodiment, and accordingly, reception sensitivity of the wireless communication apparatus can be improved.

Also, the same effect as that of the first embodiment can be obtained.

(Fourth Embodiment)

In a fourth embodiment, the configuration of the interference wave detection circuit is different from that of the first embodiment.

Figure 7:
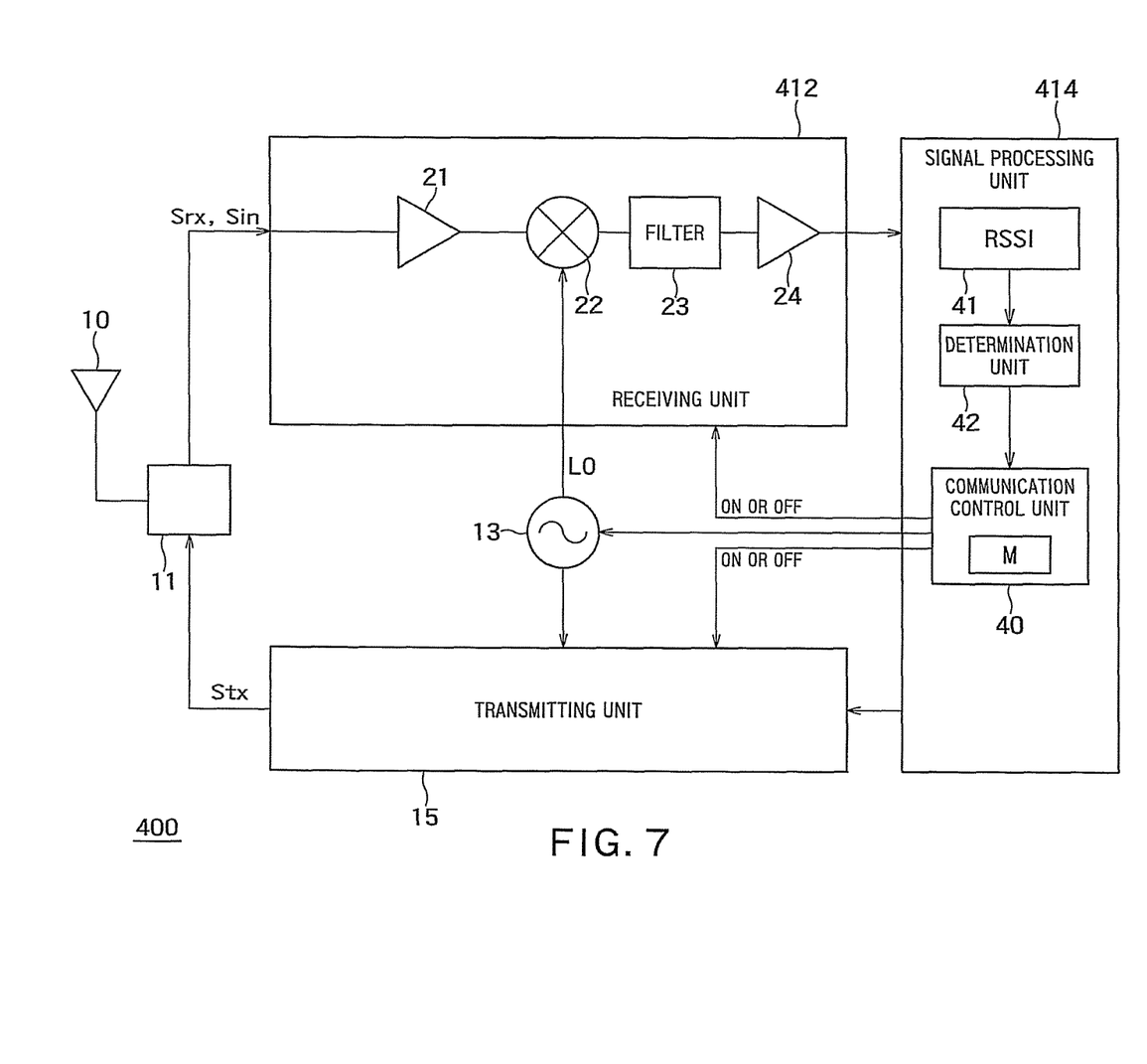
FIG. 7 is a block diagram showing a schematic configuration of a wireless communication apparatus according to a fourth embodiment of the present invention.

FIG. 7 is a block diagram showing a schematic configuration of a wireless communication apparatus 400 according to the fourth embodiment of the present invention. As shown in FIG. 7, a receiving unit 412 has the first amplifier 21, the mixer 22, the filter 23, and the second amplifier 24. The signal processing unit 414 has the communication control unit 40, a signal strength measuring unit (RSSI) 41, and a determination unit 42. The other constituent elements are the same as those of the first embodiment shown in FIG. 1. Accordingly, the same constituent elements are given the same reference numerals and the description thereof will not be repeated.

During reception, the receiving unit 412 operates in the same manner as the receiving unit 12 in the first embodiment. Specifically, the first amplifier 21 amplifies the received reception signal Srx. The mixer 22 converts the frequency of an output signal of the first amplifier 21 by the local signal LO and outputs the signal as a low frequency signal. The filter 23 band-limits the low frequency signal. The second amplifier 24 amplifies the low frequency signal that has been band-limited by the filter 23 and outputs the amplified signal as a reception baseband signal or a reception intermediate frequency signal.

On the other hand, in the interference wave detection period, the first amplifier 21, the mixer 22, the filter 23, the second amplifier 24, the signal strength measuring unit 41, and the determination unit 42 function as an interference wave detection circuit.

Specifically, the first amplifier 21 amplifies the received input signal Sin. The mixer 22, the filter 23, and the second amplifier 24 operate in the same manner as during reception. The signal strength measuring unit 41 measures the strength of the output signal of the second amplifier 24. The determination unit 42 determines that an interference wave signal is detected when the strength measured by the signal strength measuring unit 41 is greater than or equal to a reference value.

The frequency of the low frequency signal outputted from the mixer 22 has a value obtained by subtracting the frequency of the local signal LO from the frequency of the input signal Sin. The low frequency signal is band-limited by the filter 23. Therefore, when the strength of the output signal from the second amplifier 24 (that is, the strength of the band-limited low frequency signal) is greater than or equal to the reference value, the frequency obtained by adding the frequency of the local signal LO at that time and the frequency of the passband of the filter 23 is the frequency of the detected interference wave signal (detection frequency).

In the interference wave detection period, the communication control unit 40 controls the oscillator 13 so that the frequency of the local signal LO changes sequentially. Thereby, the interference wave detection circuit operates so that the detection frequency sequentially changes according to the frequency of the local signal LO. Therefore, the communication control unit 40 can identify one or more detection frequencies on the basis of the frequency of the local signal LO at the time when the interference wave detection circuit detects an interference wave signal.

The timing to detect the interference wave signal is the same as that in the first or the second embodiment. In other words, the wireless communication apparatus 400 operates as shown in the flowchart of FIG. 4 or FIG. 5.

According to the present embodiment, since no coupler is connected to the input of the first amplifier 21 of the receiving unit 412, the loss of the reception signal Srx is smaller than that of the first embodiment. Thereby, NF of the receiving unit 412 is improved compared with that of the first embodiment, and accordingly, the reception sensitivity of the wireless communication apparatus 400 can be improved.

Since a coupler is not required, the area can be smaller than that of the first embodiment.

Also, the same effect as that of the first embodiment can be obtained.

(Modification)

Although, in the description of the above embodiments, the wireless communication apparatus is compatible with Bluetooth, the wireless communication apparatus may be compatible with a wireless communication standard other than Bluetooth as long as the wireless communication apparatus performs time-division wireless communication with another wireless communication apparatus by the frequency hopping method.

The first embodiment and the second embodiment may be combined together. Specifically, the interference wave signal may be detected both in the period of time before the wireless communication is started and the period of time between transmission and reception while the wireless communication is performed.

According to the embodiments described above, it is possible to perform wireless communication without being affected by the interference wave signal.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication apparatus configured to perform time-division wireless communication with another wireless communication apparatus using a frequency hopping method, the wireless communication apparatus comprising:
   a communication control unit configured to select one frequency channel from a plurality of frequency channels and configured to switch the frequency channel to be selected as time passes;
   a transmitting unit configured to transmit a transmission signal of the selected frequency channel to the other wireless communication apparatus;
   a receiving unit configured to receive a reception signal of the selected frequency channel from the other wireless communication apparatus; and
   an oscillator configured to provide a local signal to the transmitting unit and the receiving unit,
   wherein the receiving unit comprises an interference wave detection circuit configured to detect an interference wave signal of a detection frequency, the interference wave signal is included in an input signal received during an interference wave detection period, and in the interference wave detection period, the reception signal is not received, and
   the communication control unit is configured to mask a frequency channel related to the detection frequency among the plurality of frequency channels to create a frequency channel map, the interference wave signal is detected at the detection frequency by the interference wave detection circuit, and the communication control unit does not select the masked frequency channel,
   wherein the communication control unit controls the oscillator so that a frequency of the local signal changes sequentially during the interference wave detection period, and
   the interference wave detection circuit sequentially changes the detection frequency according to the frequency of the local signal.

2. A wireless communication apparatus configured to perform time-division wireless communication with another wireless communication apparatus using a frequency hopping method, the wireless communication apparatus comprising:
   a communication control unit configured to select one frequency channel from a plurality of frequency channels and configured to switch the frequency channel to be selected as time passes;
   a transmitting unit configured to transmit a transmission signal of the selected frequency channel to the other wireless communication apparatus;
   a receiving unit configured to receive a reception signal of the selected frequency channel from the other wireless communication apparatus; and
   an oscillator configured to provide a local signal to the transmitting unit and the receiving unit,
   wherein the receiving unit comprises an interference wave detection circuit configured to detect an interference wave signal of a detection frequency, the interference wave signal is included in an input signal received during an interference wave detection period, and in the interference wave detection period, the reception signal is not received, and
   the communication control unit is configured to mask a frequency channel related to the detection frequency among the plurality of frequency channels to create a frequency channel map, the interference wave signal is detected at the detection frequency by the interference wave detection circuit, and the communication control unit does not select the masked frequency channel,
   wherein the interference wave detection circuit comprises a coupler configured to detect the received input signal, and a determination unit configured to determine that the interference wave signal is detected if a signal level at the detection frequency of a detection input signal detected by the coupler is greater than or equal to a reference value,
   wherein the receiving unit comprises
   a first amplifier configured to amplify the received reception signal,
   a mixer configured to convert a frequency of an output signal of the first amplifier by the local signal and configured to output the output signal as a low frequency signal,
   a filter configured to band-limit the low frequency signal, and
   a second amplifier configured to amplify the low frequency signal band-limited by the filter,
   wherein the coupler is connected to an input of the first amplifier.

3. The wireless communication apparatus according to claim 2, wherein
   the coupler is formed by a capacitor,
   one terminal of the capacitor is connected to an input of the first amplifier, and
   the other terminal of the capacitor is connected to the determination unit.

4. The wireless communication apparatus according to claim 2, wherein
   the coupler is formed by a transformer,
   the reception signal and the input signal are provided to one terminal of the primary side of the transformer,
   the other terminal of the primary side of the transformer is connected to an input of the first amplifier,
   a bias voltage is supplied to one terminal of the secondary side of the transformer, and
   the other terminal of the secondary side of the transformer is connected to the determination unit.

5. A wireless communication apparatus configured to perform time-division wireless communication with another wireless communication apparatus using a frequency hopping method, the wireless communication apparatus comprising:
   a communication control unit configured to select one frequency channel from a plurality of frequency channels and configured to switch the frequency channel to be selected as time passes;
   a transmitting unit configured to transmit a transmission signal of the selected frequency channel to the other wireless communication apparatus;
   a receiving unit configured to receive a reception signal of the selected frequency channel from the other wireless communication apparatus; and an oscillator configured to provide a local signal to the transmitting unit and the receiving unit, wherein the receiving unit comprises an interference wave detection circuit configured to detect an interference wave signal of a detection frequency, the interference wave signal is included in an input signal received during an interference wave detection period, and in the interference wave detection period, the reception signal is not received, and the communication control unit is configured to mask a frequency channel related to the detection frequency among the plurality of frequency channels to create a frequency channel map, the interference wave signal is detected at the detection frequency by the interference wave detection circuit, and the communication control unit does not select the masked frequency channel, wherein the interference wave detection circuit comprises a coupler configured to detect the received input signal, and a determination unit configured to determine that the interference wave signal is detected if a signal level at the detection frequency of a detection input signal detected by the coupler is greater than or equal to a reference value, wherein the receiving unit comprises a first amplifier configured to amplify the received reception signal and the received input signal, a mixer configured to convert a frequency of an output signal of the first amplifier by the local signal and configured to output the output signal as a low frequency signal, a filter configured to band-limit the low frequency signal, and a second amplifier configured to amplify the low frequency signal band-limited by the filter, wherein the coupler is connected to an output of the first amplifier.

6. The wireless communication apparatus according to claim 1, wherein the receiving unit comprises a first amplifier configured to amplify the received input signal, a mixer configured to convert a frequency of an output signal of the first amplifier by the local signal and configured to output the output signal as a low frequency signal, a filter configured to band-limit the low frequency signal, and a second amplifier configured to amplify the low frequency signal band-limited by the filter, and the wireless communication apparatus further comprises a signal strength measuring unit configured to measure strength of an output signal of the second amplifier, and a determination unit configured to determine that the interference wave signal is detected when the strength measured by the signal strength measuring unit is greater than or equal to a reference value, wherein the first amplifier, the mixer, the filter, the second amplifier, the signal strength measuring unit, and the determination unit function as the interference wave detection circuit during the interference wave detection period.

7. The wireless communication apparatus according to claim 6, wherein a frequency, obtained by adding a frequency of the local signal when the strength measured by the signal strength measuring unit is greater than or equal to the reference value and a frequency of a passband of the filter, is the detection frequency of the detected interference wave signal.

8. The wireless communication apparatus according to claim 6, wherein the first amplifier amplifies the received reception signal during reception.

9. The wireless communication apparatus according to claim 1, wherein the interference wave detection period is a period of time before performing the wireless communication with the other wireless communication apparatus.

10. The wireless communication apparatus according to claim 1, wherein the interference wave detection period is a period of time between transmission and reception while the wireless communication with the other wireless communication apparatus is being performed.

11. The wireless communication apparatus according to claim 1, wherein the communication control unit masks frequency channels within a predetermined frequency range around the detection frequency.

12. The wireless communication apparatus according to claim 1, wherein the wireless communication apparatus is compatible with Bluetooth.

13. The wireless communication apparatus according to claim 12, wherein the interference wave signal is a signal of a W-CDMA system.

14. The wireless communication apparatus according to claim 1, further comprising:

an antenna configured to transmit the transmission signal and receive the reception signal, and a switching unit configured to provide the reception signal received by the antenna to the receiving unit and configured to provide the transmission signal outputted from the transmitting unit to the antenna.

* * * * *